(12) United States Patent
Kopel et al.

(10) Patent No.: US 9,061,825 B2
(45) Date of Patent: *Jun. 23, 2015

(54) SYRUP CAPSULE AND METHOD OF USING SAME

(71) Applicant: SodaStream Industries Ltd., Ben Gurion Airport (IL)

(72) Inventors: Yaron Kopel, Tel Aviv (IL); Allan Ring, Mercaz Shapira (IL); Avi Cohen, Jerusalem (IL); Hagai Harduff, Binyamina (IL); Doron Krom, Zichron Yaakov (IL); Amit Avigdor, Moshav Nizaney Oz (IL); Eyal Fendell, Tel Aviv (IL)

(73) Assignee: SodaStream Industries Ltd., Airport City, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/322,947

(22) Filed: Jul. 3, 2014

(65) Prior Publication Data

US 2014/0314938 A1    Oct. 23, 2014

Related U.S. Application Data

(63) Continuation of application No. 13/757,875, filed on Feb. 4, 2013, now Pat. No. 8,795,748.

(60) Provisional application No. 61/593,955, filed on Feb. 2, 2012.

(51) Int. Cl.
*B65D 85/804* (2006.01)
*B65D 85/72* (2006.01)
(Continued)

(52) U.S. Cl.
CPC ............. *B65D 85/804* (2013.01); *B65D 85/72* (2013.01); *B65D 81/3211* (2013.01); *A23L 2/52* (2013.01)

(58) Field of Classification Search
CPC ............... A23L 2/52; A23L 2/56; A23L 2/60; B65D 81/3211; B65D 85/72; B65D 85/804
USPC .......... 426/115, 590; 215/228, 329, 297, 235, 215/252
See application file for complete search history.

(56) References Cited

U.S. PATENT DOCUMENTS 3,966,089 A    6/1976    Klingaman
2006/0260959 A1    11/2006    Patterson et al.
(Continued)

FOREIGN PATENT DOCUMENTS

CN    2325334    6/1999
IT    272011    10/2011
(Continued)

OTHER PUBLICATIONS

International Search Report for corresponding PCT Application PCT/IB2013/050933 mailed on Jul. 19, 2013.
Machine translation of JP 2599763 downloaded from the JPO website on Feb. 12, 2015.
(Continued)

*Primary Examiner* — Anthony Weier
(74) *Attorney, Agent, or Firm* — Eitan, Mehulal & Sadot

(57) ABSTRACT

A capsule for storing a fixed amount of syrup. The capsule includes a housing to store the fixed amount of syrup and is shaped to sit on the rim of a bottle of carbonated water. The capsule also includes a release mechanism to release the syrup in a controlled manner into the bottle. The capsule is shaped so that excess gas is released into the atmosphere between at least one of the outside walls of the capsule and the inner wall of the opening of the bottle of carbonated water. The invention includes a method for releasing syrup from a capsule into a bottle of carbonated water. The method includes the capsule being placed on a rim of the bottle and the capsule receiving a downward force.

18 Claims, 14 Drawing Sheets

(51) Int. Cl.
  *B65D 81/32*  (2006.01)
  *A23L 2/52*  (2006.01)

(56) References Cited

U.S. PATENT DOCUMENTS

2007/0023381 A1   2/2007  Cerveny
2008/0290060 A1  11/2008  Ammann
2010/0140209 A1   6/2010  Valentine
2011/0163119 A1   7/2011  Nyambi et al.
2014/0070432 A1*  3/2014  Tatera ........................ 261/34.1

FOREIGN PATENT DOCUMENTS

JP    644693      2/1989
JP    2599763     9/1999
JP    2008532873  8/2008
WO    2006099768  9/2006

OTHER PUBLICATIONS

Machine translation of CN 2325334 downloaded from EPO website on Mar. 19, 2015.

* cited by examiner

SYRUP CAPSULE AND METHOD OF USING SAME

CROSS-REFERENCE TO RELATED APPLICATIONS

This application is a continuation application claiming benefit from U.S. patent application Ser. No. 13/757,875 filed 4 Feb. 2013, now U.S. Pat. No. 8,795,748, which is hereby incorporated in its entirety by reference and which claims priority and benefit from U.S. provisional patent application No. 61/593,955 filed on 2 Feb. 2012, which is also hereby incorporated by reference in its entirety.

FIELD OF THE INVENTION

The present invention relates to home carbonation systems generally and to the addition of flavoring in particular.

BACKGROUND OF THE INVENTION

Home carbonation systems are known in the art and provide a convenient solution for fizzy drink lovers that do not wish to carry home heavy bottles of drink from the shops. They are also a perfect alternative to providing freshly made fizzy drinks on demand. One of the reasons that these systems are so popular is due to the myriad of flavorings that can be purchased to go with these systems, such as pomegranate and bitter orange that exceed the range available with pre-bottled drinks.

SUMMARY OF THE INVENTION

There is provided, in accordance with a preferred embodiment of the present invention a capsule for storing a fixed amount of syrup. The capsule includes a housing to store the fixed amount of syrup and is shaped to sit on the rim of a bottle of carbonated water. The capsule also includes a release mechanism to release the syrup in a controlled manner into the bottle. The capsule is shaped so that excess gas is released into the atmosphere between at least one of the outside walls of the capsule and the inner wall of the opening of the bottle of carbonated water.

Moreover, in accordance with a preferred embodiment of the present invention, the capsule also includes a membrane between the housing and the release mechanism.

Further, in accordance with a preferred embodiment of the present invention, the release mechanism includes a cutting element to cut the membrane to release the syrup.

Still further, in accordance with a preferred embodiment of the present invention, the cutting element is a non-integral part of the release mechanism.

Additionally, in accordance with a preferred embodiment of the present invention, the cutting element is an integral part of the release mechanism.

Moreover, in accordance with a preferred embodiment of the present invention, the capsule includes multiple apertures to enable flow of the syrup to the inner sides of the bottle after the cutting.

Still further, in accordance with a preferred embodiment of the present invention, the housing and the release mechanism are an integral part of the capsule.

Additionally, in accordance with a preferred embodiment of the present invention, the release mechanism includes fragile elements breakable under pressure to form multiple apertures in the base of the capsule.

Moreover, in accordance with a preferred embodiment of the present invention, the multiple apertures enable the flow of the syrup into the bottle.

There is provided, in accordance with a preferred embodiment of the present invention method for releasing syrup from a capsule into a bottle of carbonated water. The method includes the capsule being placed on a rim of the bottle and the capsule receiving a downward force with the capsule allowing excess gases to vent into the atmosphere via the area between at least one of the outside walls of the capsule and the inner wall of the opening of the bottle.

Moreover, in accordance with a preferred embodiment of the present invention, the capsule includes a housing to store the syrup and a release mechanism.

Further, in accordance with a preferred embodiment of the present invention, the capsule has a membrane between the housing and the release mechanism.

Still further, in accordance with a preferred embodiment of the present invention, the release mechanism includes a cutting element to cut the membrane to allow the release of the syrup into the bottle.

Additionally, in accordance with a preferred embodiment of the present invention, the cutting element is an integral part of the release mechanism.

Moreover, in accordance with a preferred embodiment of the present invention, the release mechanism includes multiple apertures to enable the flow of the syrup down the inner sides of the bottle after the cutting to ensure minimal frothing.

Still further, in accordance with a preferred embodiment of the present invention, the housing and the release mechanism are an integral part of the capsule.

Additionally, in accordance with a preferred embodiment of the present invention, the release mechanism includes fragile elements breakable under pressure to form multiple apertures in the base of the capsule.

Moreover, in accordance with a preferred embodiment of the present invention the multiple apertures enable the flow of the syrup down the inner sides of the bottle to ensure minimal frothing.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
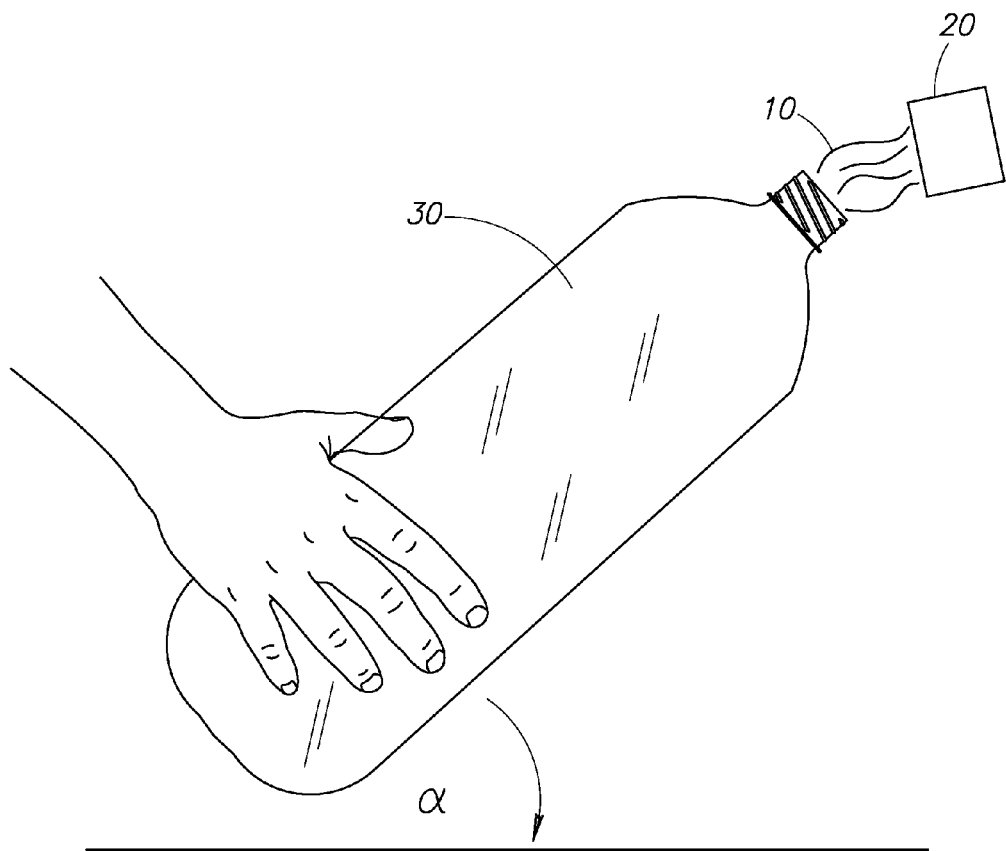
FIG. 1 is a schematic illustration of a prior art method of adding syrup to a bottle of pre-carbonated water.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicants have realized that adding flavored syrup to pre-carbonated water creates a lot of effervescence and can be improved. Water is usually carbonated by attaching a purpose designed bottle of water to a home soda machine and activating the system with several presses of a push button which adds carbon dioxide to the water. Reference is now made to FIG. 1 which illustrates the addition of syrup to a bottle of pre carbonated water. Syrup 10 is poured from cap 20 into bottle 30 which is held at an undefined angle $\alpha$. This is to slow down the speed at which syrup 10 hits the carbonated water in order to lessen their reaction and to produce less effervescence as well as to prevent the vented gas (CO2) created by the aforementioned reaction from escaping vertically and from removing water from bottle 30. Bottle 30 is typically shaken at the end of the procedure to ensure dispersion of syrup 10.

It will be appreciated that angle $\alpha$ cannot be determined to provide a best case angle for pouring since the different syrups have different parameters which affect the reaction, such as the type and quality of the syrup and the level of carbonation of the water. It will further be appreciated that different users will carbonate their water at different levels according to the number of presses on the home soda machine.

Applicants have further realized that the use of syrups that come in bottles may be susceptible to spillages, especially when trying to pour a measure into a small lid for addition to the carbonated water. These syrups may also be very sticky.

Figure 2:
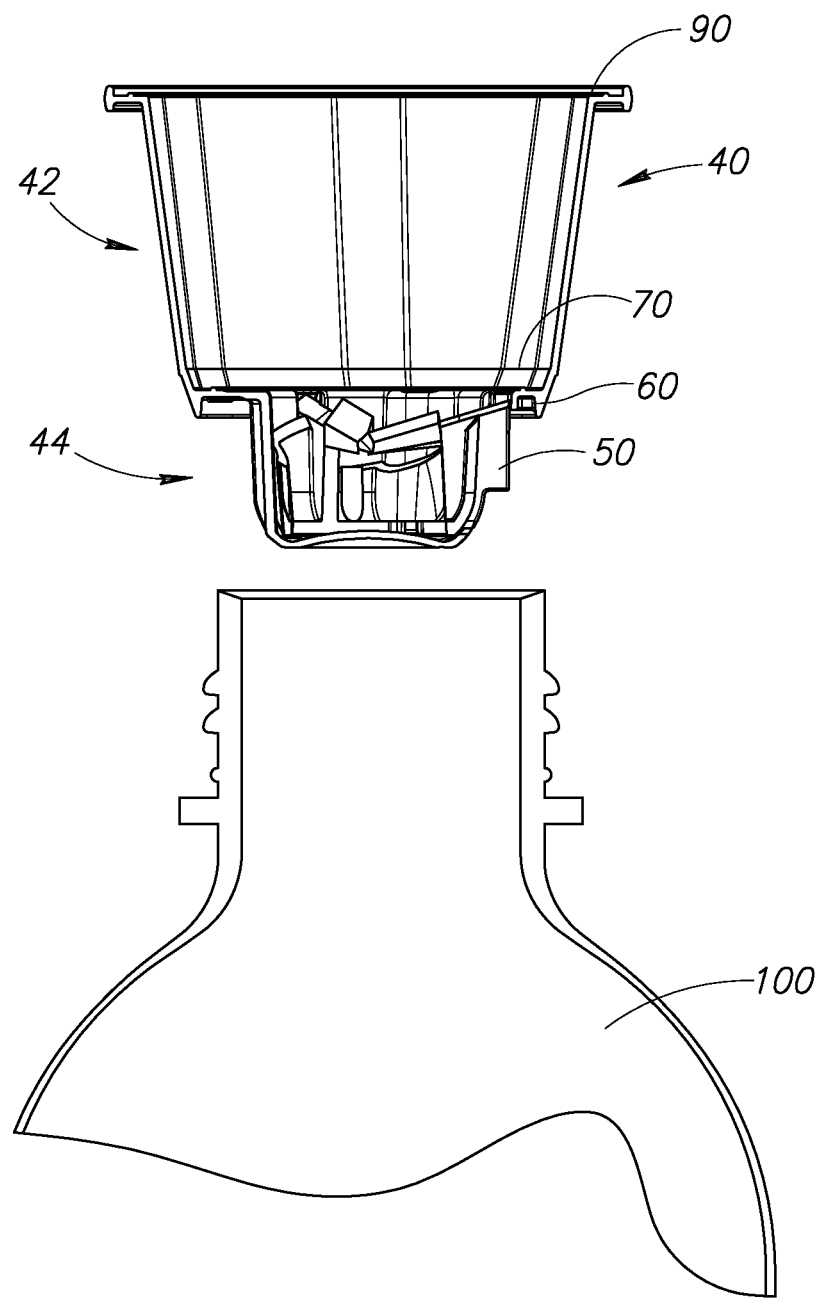
FIG. 2 is a side view illustration of a novel syrup capsule for use with standard home carbonation systems, ready to be placed on a bottle, constructed and operative in accordance with the present invention.
Figure 3:
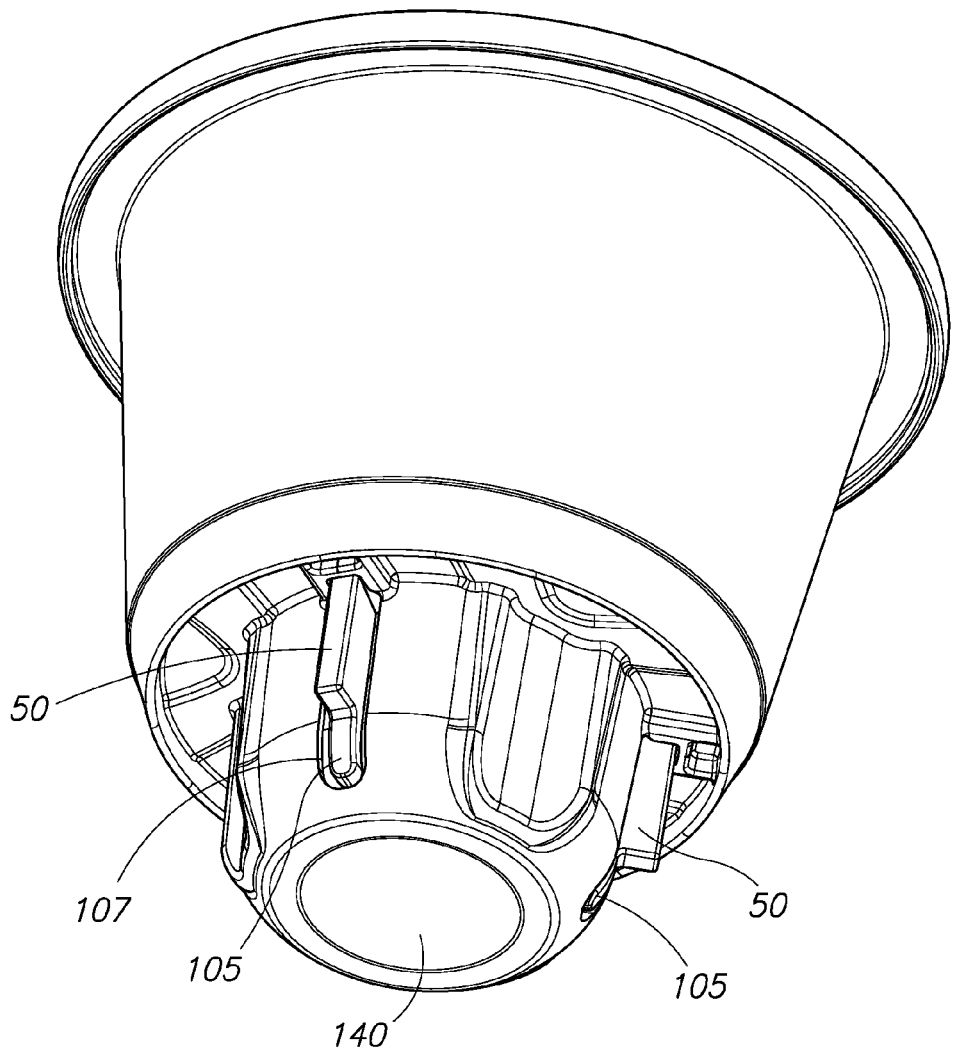
FIG. 3 is an isometric illustration of the underside of the syrup capsule of FIG. 1, constructed and operative in accordance with the present invention.
Figure 4:
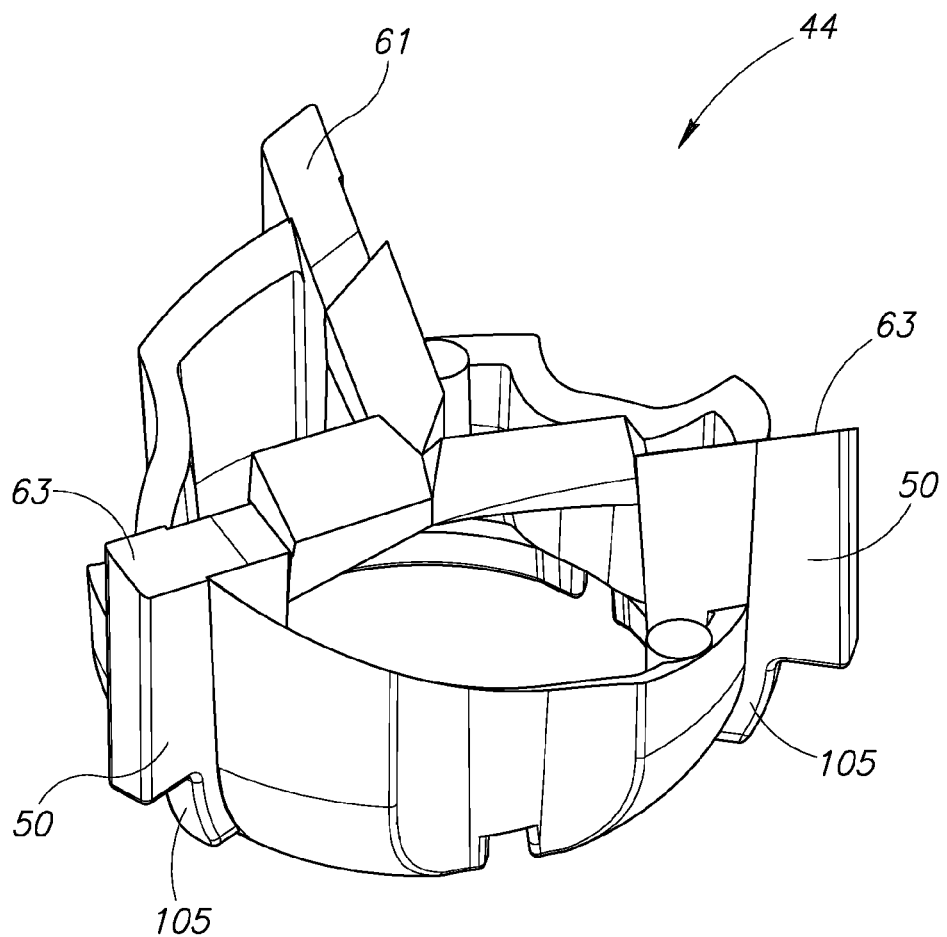
FIG. 4 is an isometric illustration of a release mechanism forming part of the syrup capsule of FIG. 1, constructed and operative in accordance with the present invention.

Reference is now made to FIGS. 2, 3 and 4, which illustrate a novel syrup capsule 40 for use with standard home carbonation systems. FIG. 2 illustrates capsule 40 to be placed on a bottle 100. FIG. 3 shows the underside of capsule 40 and FIG. 4 illustrates a release mechanism 44 forming part of capsule 40.

Capsule 40 comprises a storage area 42 and release mechanism 44. Storage area 42 comprises a thin membrane 70 and a lid 90. Release mechanism 44 is a single, integrally formed unit comprising three stubs 50 and Y-shaped blade 60. It will be appreciated that capsule 40 may hold syrup 80 in storage area 42 between thin membrane 70 and lid 90 and that capsule 40 is designed to fit onto the neck of bottle 100. It will be appreciated that storage area 42 may be separated from release mechanism 44 by thin membrane 70.

As illustrated in FIG. 3, to which reference is now made, all three stubs 50, may be positioned equidistantly from each other. It will be appreciated that, integrally formed with each stub 50 may be a protrusion 105. Protrusion 105 and stub 50 may be initially positioned within a slot 107 and may be slidable within slot 107 to open an aperture 110 (FIG. 6) to release syrup 80 into bottle 100 (described in more detail hereinbelow). FIG. 3 also illustrates the sealed base 140 of capsule 40.

As can be seen in FIG. 4, Y-shaped blade 60 may have "legs" 61, 62 and 63. Each leg 61, 62 and 63 may be affixed to the top of a stub 50.

Figure 5:
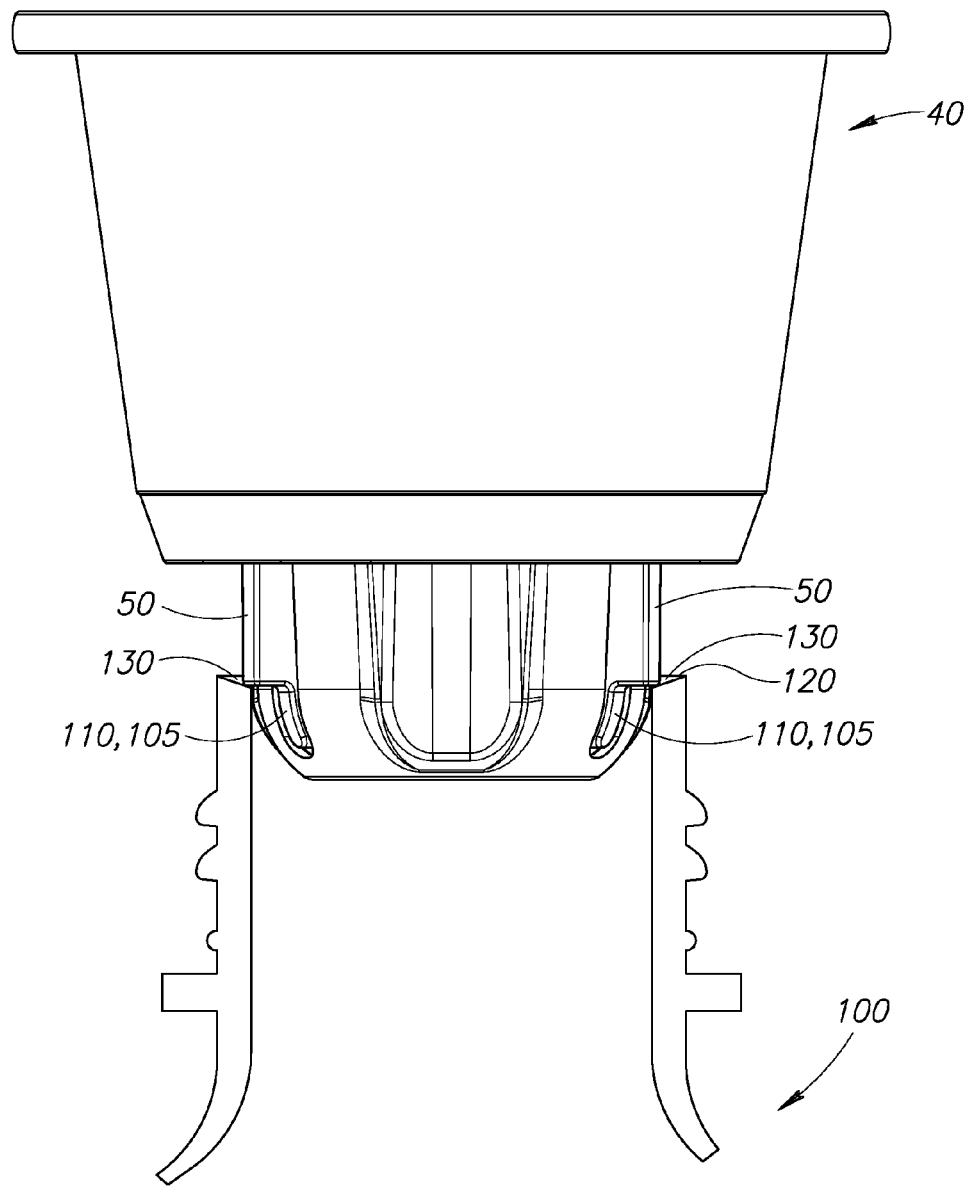
FIG. 5 is a side view illustration of the syrup capsule of FIG. 1 positioned over a bottle of pre carbonated water and ready to use.

As illustrated in FIG. 5, to which reference is now made, capsule 40 may be placed over the neck of bottle 100 and may be gently lowered into position until each stub 50 comes into contact with part of rim 120 of bottle 100. Thus, in FIG. 5, capsule 40 is positioned on the neck of bottle 100, balanced on the three stubs 50, and is ready for use.

Figure 6:
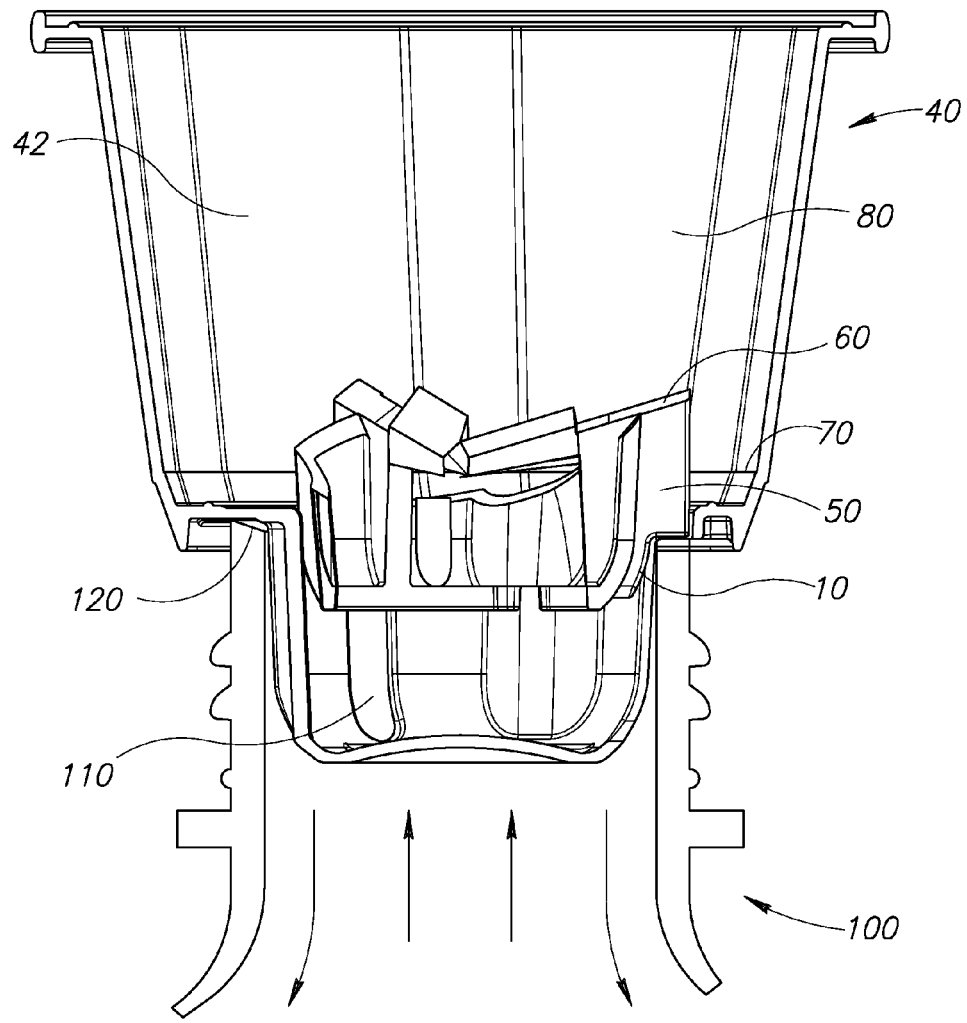
FIG. 6 is a side view illustration of the syrup capsule of FIG. 1 once it has been pushed downwards against the rim of a bottle of pre-carbonated water, constructed and operative in accordance with the present invention.

Capsule 40 may then be given a small push, the downward force of which may cause capsule 40 push against rim 120 of bottle 100. Reference is now made to FIG. 6 which illustrates a side view of capsule 40 once it has been pushed downwards against rim 120 of bottle 100. It will be appreciated that although capsule 40 is forced into a downward motion, release mechanism 44 may be prevented from moving downwards due to the positioning of stubs 50 on rim 120 and remains in place. Therefore, when capsule 40 is pushed downward, storage area 42 also moves downwards and thin membrane 70 may be pushed against the three legs of blade 60 which remain in their original position. It will be appreciated that this relative motion may cause blade 60 to cut through thin membrane 70, releasing syrup 80.

It will be further appreciated that capsule 40 may continue to move downwards leaving release mechanism 44 balanced in its position on rim 120. Since protrusions 105 covering apertures 110 are part of release mechanism 44 they also may remain in position. Thus the downward motion of capsule 40 may cause stubs 50 and protrusions 105 to slide up within slot 107, thereby opening apertures 110 to open to allow for the flow of syrup 80 downwards into bottle 100.

It will also be appreciated that since the base 140 of capsule 40 may be sealed, syrup 80 may be released into bottle 100 via apertures 110 only and may flow into bottle 100 via the inner sides of the bottle due to their viscosity as shown by the downward arrows in FIG. 6. It will further be appreciated that this 3-way release of syrup 80 into bottle 100 of carbonated water may lessen the kinetic energy at which syrup 80 hits the carbonated water and therefore may considerably decrease the amount of effervescence created. It will also be appreciated that once all of syrup 80 has been released into the carbonated water; bottle 100 need not be shaken.

It will be appreciated that excess gas may be created during the addition of syrup 80 to the carbonated water. Some of this excess gas may escape into the atmosphere through a small gap 130 between capsule 40 and bottle 100. Excess gas may also escape into capsule 40 via apertures 110 and create a pressure. This pressure in turn may accelerate the flow of syrup 80 into bottle 100. Lid 90 may also be designed accordingly to withstand extra stress from escaping gas in order not to break. It will be appreciated the size of slots 107 may be designed accordingly to allow for a steady flow of syrup and to allow vented gas to escape.

It will be appreciated that capsule 40 and all its components may be 100% biodegradable and may also be manufactured from a non-permeable plastic to prevent natural oxidation of syrup 80. A typical plastic used for manufacture may be polyethylene terephthalate (PET). It will also be appreciated that thin membrane 70 and lid 90 may be welded or glued to capsule 40.

It will be appreciated that the amount of syrup 80 contained in capsule 40 is 52 cc to make a liter of drink and that this amount is uniform throughout the range of different flavored syrups available. The viscosity and sugar levels may vary from flavored syrup to flavored syrup and this may be taken into consideration during manufacture.

Figure 7A:
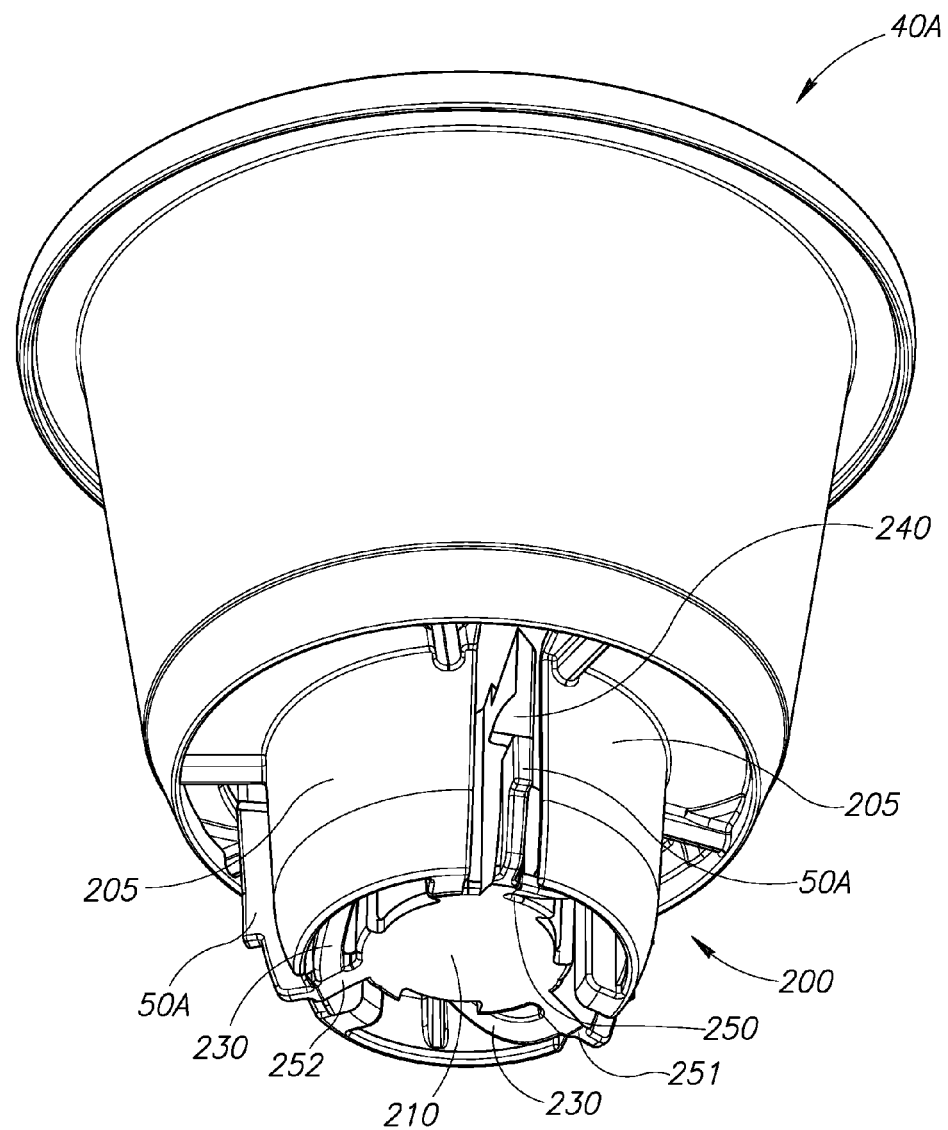
FIGS. 7A, 7B, 7C and 7D are isometric illustrations of an alternative embodiment of the present invention, constructed and operative in accordance with the present invention.
Figure 7B:
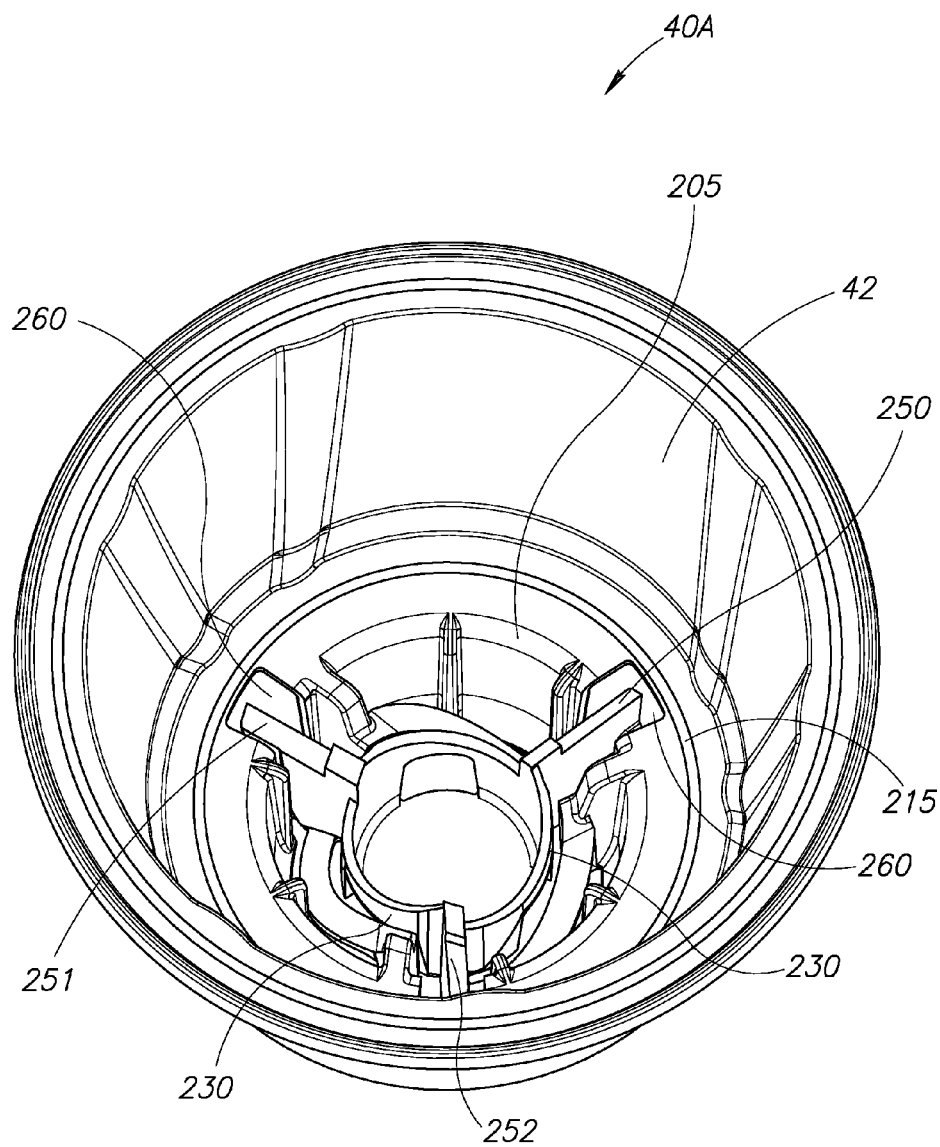
Figure 7C:
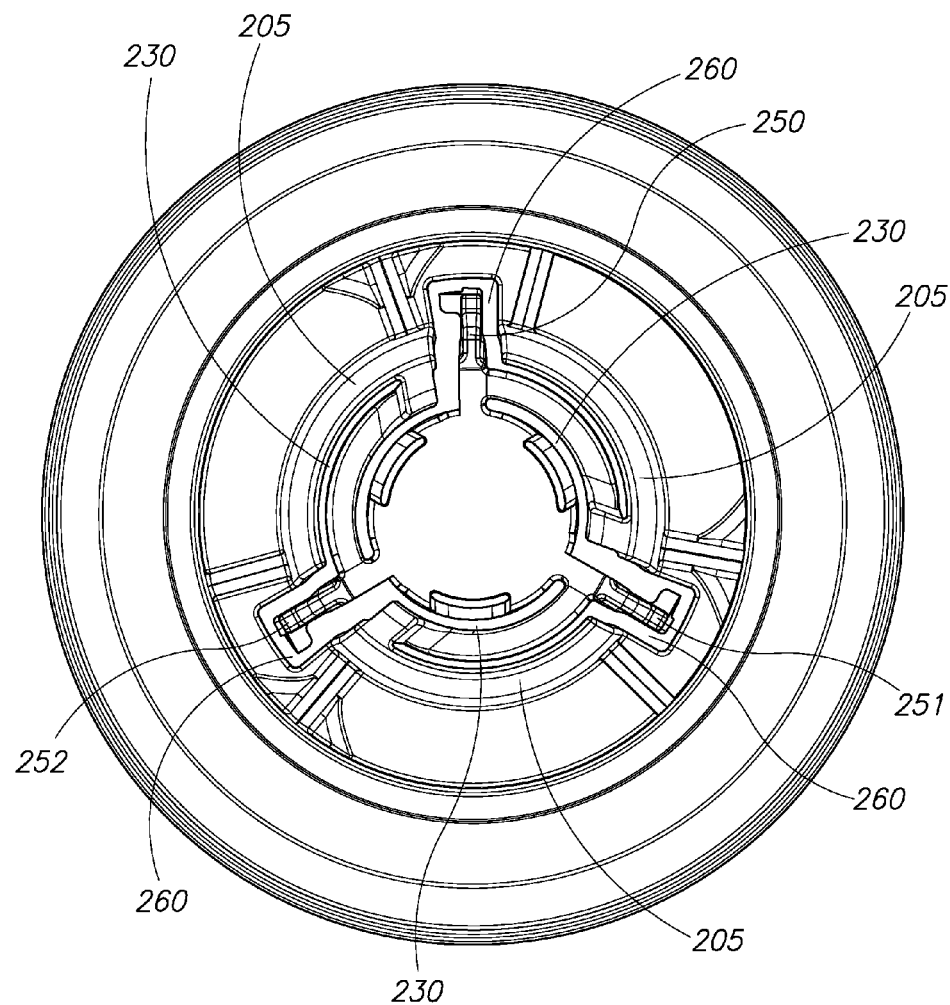
Figure 7D:
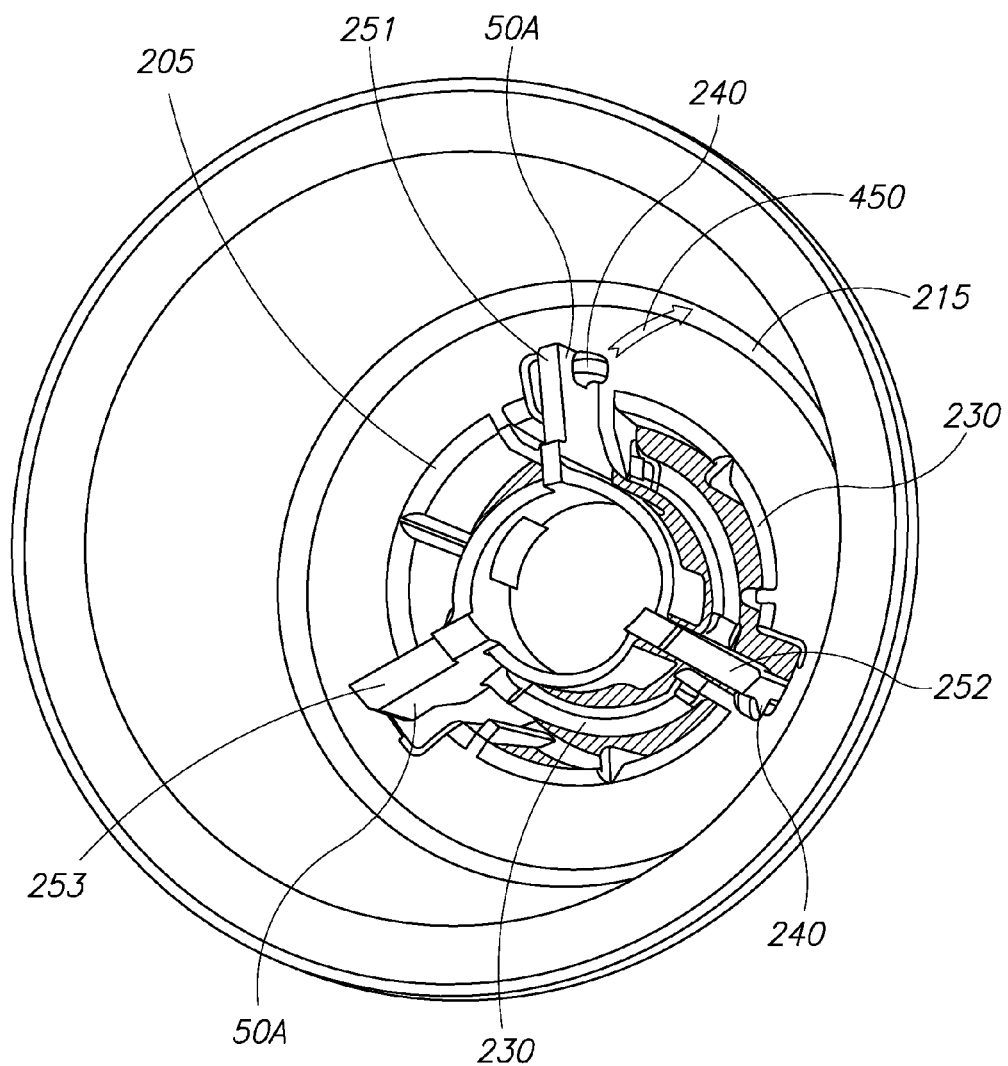

In an alternative embodiment to the present invention, the release mechanism to release syrup 40 into bottle 100 may be an integral part of capsule 40. Reference is now made to FIGS. 7A, 7B, 7C and 7D which are isometric illustrations of an integral knife capsule 40A. FIGS. FIGS. 7A, 7B, 7C illustrate respectively isometric figures looking towards the side, top and bottom of capsule 40A. FIG. 7D illustrates the state of capsule 40A once it has been used.

Capsule 40A may comprise the same storage area 42 as capsule 40 together with membrane 70 and lid 90 in order to house syrup 80. It will also be appreciated that capsule 40A may have a release mechanism 200 which may be part of the same piece of plastic as storage area 42A. Release mechanism 200 comprises three wall pieces 205, three bottle stubs 50A, a base 210, a plastic spring 230, three resting stubs 240 and three blades 250, 251 and 252. It will be appreciated that thin membrane 70 may be affixed internally to ledge 215 which may be situated at the seam between housing 42 and release mechanism 200.

It will be appreciated that wall pieces 205 may be joined to housing area 42 via spring 230 as is illustrated in FIG. 7B to which reference is now made. Spring 230 may also be integrally formed with stubs 50A which, in turn, may be formed at their upper portions with blades 250, 251 and 252.

It will be appreciated that there may be an aperture 260 between blades 250, 251 and 252 and thin membrane 70 as illustrated in FIG. 7C to which reference is now made. It will also be appreciated that the flexibility of spring 230 may allow movement of stubs 50 and blades 250, 251 and 252 within aperture 260.

As described hereinabove, stubs 50A may be used to position capsule 40A on the neck of bottle 40 so that each stub 50A sits on rim 120 of bottle 100. Once capsule 40A is positioned and ready for use, the force of a downward push on capsule 40A may cause stubs 50A to rise upwards towards membrane 70 within aperture 260 due to the flexibility of spring 230. Since blades 250, 251 and 252 are connected to stubs 50, they may also be forced to move upwards eventually cutting through membrane 70 and releasing syrup 80.

Reference is now made to FIG. 7D which illustrates the state of capsule 40A once it has been used. It will be further appreciated, that attached to stubs 50A, may be additional resting stubs 240. Resting stubs 240 may be positioned perpendicular to stubs 50A. It will be appreciated that the motion of stubs 50 pushing upwards may cause spring 230 to slightly rotate allowing for resting stubs 40 to 'rest' on ledge 215 thus 'locking' release mechanism 200 in place as shown by arrow 450 and allowing for syrup 80 to flow into bottle 100.

It will also be appreciated that aside from through aperture 260, the area between wall pieces 205, base 210 and spring 230 as well as around spring 230 may also be open as is illustrated by the shaded areas in FIG. 7D. It will also be appreciated that solid base 210 may ensure that the syrup flows out of capsule 40A around base 210 and towards the sides of bottle 100 for a contained reaction with the carbonated water as is described hereinabove. It will be further appreciated that these various apertures and openings may also release any excess gas created as described hereinabove.

Figure 8A:
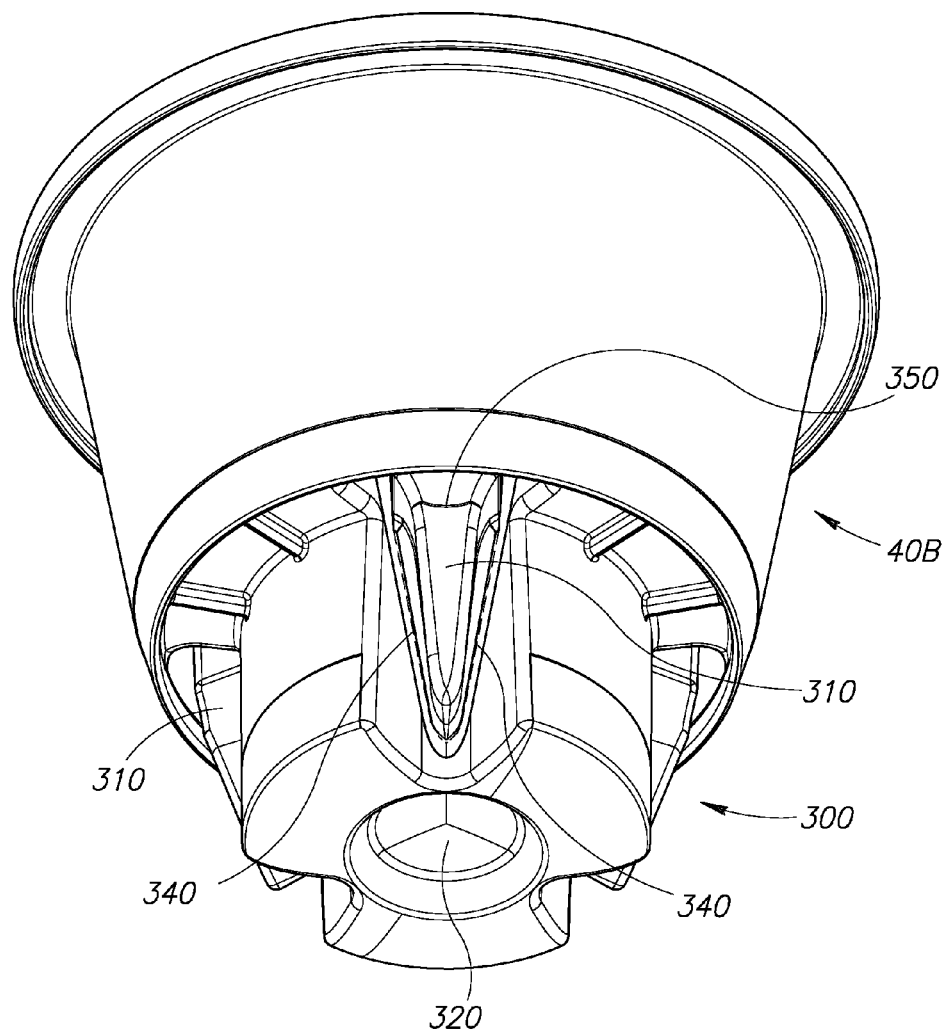
FIGS. 8A, 8B, 8C and 8D are isometric illustrations of another alternative embodiment of the present invention, constructed and operative in accordance with the present invention.
Figure 8B:
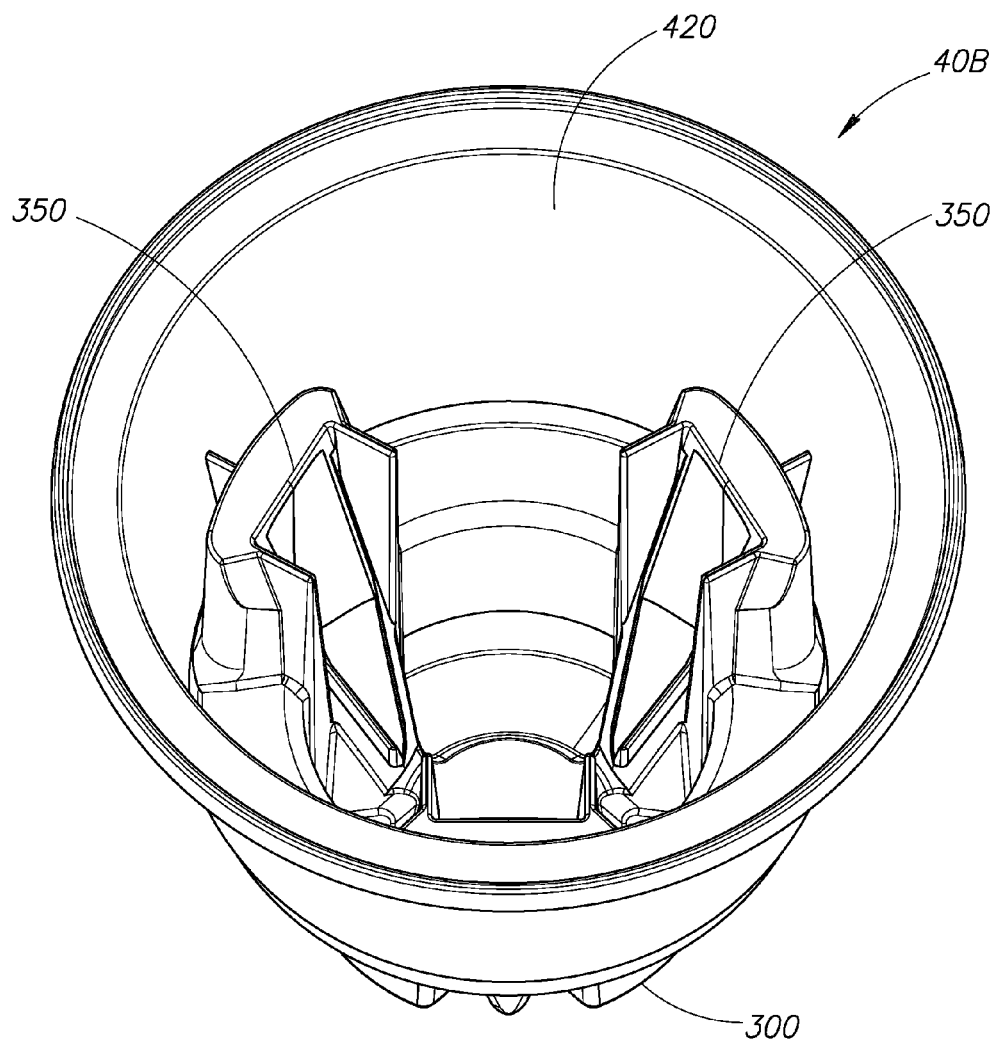
Figure 8C:
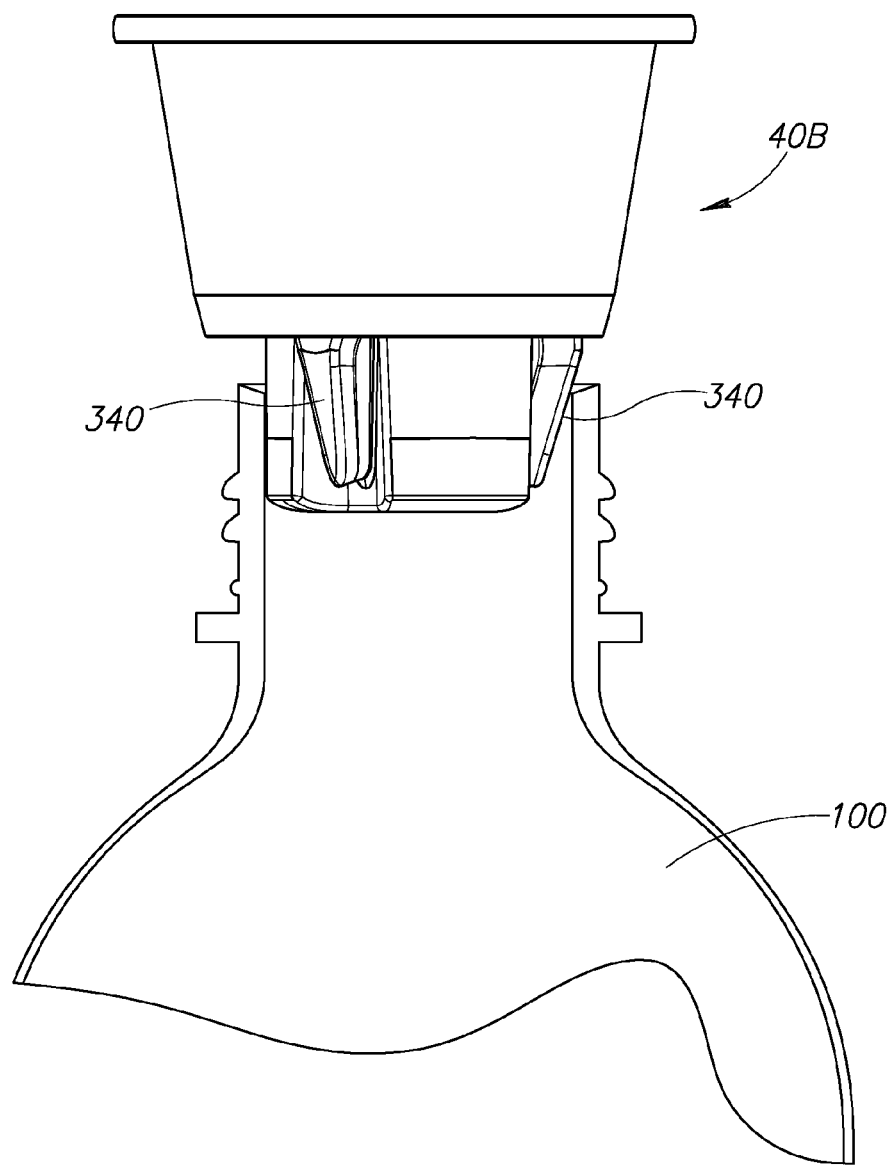

In an alternative embodiment to the present invention, capsule 40 may have a totally sealed base thus not requiring thin membrane 70 to hold syrup 80. It will be appreciated that capsule 40C may also be crafted from a single piece of material. Reference is now made to FIGS. 8A and 8B, which illustrate respectively isometric figures looking towards the side and top of such a capsule 40B. Reference is also made to FIG. 8C which illustrates capsule 40B positioned on bottle 100 ready for use and FIG. 8D which illustrates capsule 40B after it has been used.

As can be seen in FIG. 8B, capsule 40B may comprise storage area 420 and release mechanism 300. It will be appreciated that storage area 420 may consist of the entire capsule 40B which may be hollow to allow for storage of syrup 80, whose amount may be adjusted accordingly. Capsule 40B may be sealed using lid 90 as is described hereinabove. Release mechanism 300 comprises three ribs 310 (only two ribs 310 may be seen in FIG. 8B); a base 320 and integral hinges 350. It will be appreciated that release mechanism 300 may be perforated (340) in the areas connecting ribs 310 to capsule 40B thus rendering release mechanism 300 fragile and thus allowing for easy breakage. It will also be appreciated that ribs 310 may be triangular in shape to aid positioning of capsule 40B within the neck of bottle 100 as illustrated in FIG. 8C and to aid their breakage at the perforations under pressure as described in more detail herein below.

Figure 8D:
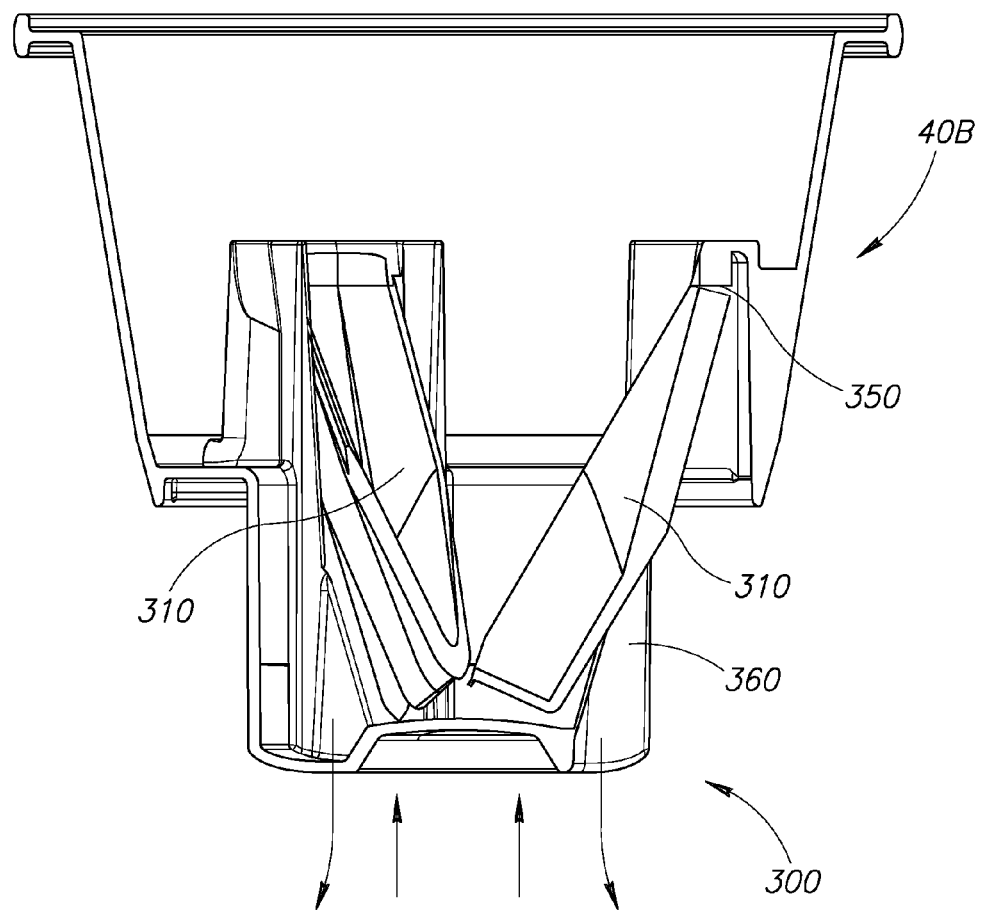

It will be appreciated that the force of a downward push against capsule 40B may cause pressure against ribs 310 pushing them inwards and eventually breaking perforation 340 connecting them to capsule 40B as is illustrated in FIG. 8D. It will also be appreciated that this inward movement of ribs 310 may allow for capsule 40B to be lowered slightly into the neck of bottle 100. It will be further appreciated that the breaking of the perforation 340 may open up an aperture 360 which may allow for the flow of syrup 80 into bottle 100. It will be appreciated that once perforation 340 has been broken, integral hinges 350 may keep ribs 310 attached to capsule 40B, ensuring that ribs 310 do not entirely break off from capsule 40B and accidentally enter bottle 100 together with syrup 80. It will also be appreciated that base 320 may ensure that syrup 80 may only flow from capsule 40B via apertures 360 ensuring a flow into bottle 100 via the sides ensuring a controlled reaction with the carbonated water as is described herein above. It will be appreciated, that in the same manner, excess gases may be released.

It will further be appreciated that the use of capsules of syrup over of bottles may add to the repertoire of flavors that can be sampled at a lower cost without the need to purchase whole bottles of syrup.

It will also be appreciated that capsules 40, 40A and 40B may be used with existing home carbonation systems without requiring any changes to current technology.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A capsule for storing a fixed amount of syrup, the capsule comprising:
    a housing to store said fixed amount of syrup and shaped to sit on the rim of a bottle of carbonated water;
    a release mechanism to release said syrup in a controlled manner into said bottle, and wherein said capsule is shaped so that excess gas is released into the atmosphere between at least one of the outside walls of said capsule and the inner wall of the opening of said bottle of carbonated water.

2. The capsule according to claim 1 and also comprising a membrane between said housing and said release mechanism.

3. The capsule according to claim 2 and wherein said release mechanism comprises a cutting element to cut said membrane to release said syrup.

4. The capsule according to claim 3 and wherein said cutting element is a non-integral part of said release mechanism.

5. The capsule according to claim 3 and wherein said cutting element is an integral part of said release mechanism.

6. The capsule according to claim 3 and wherein said capsule comprises multiple apertures to enable flow of said syrup to the inner sides of said bottle after said cutting.

7. The capsule according to claim 1 and wherein said housing and said release mechanism are an integral part of said capsule.

8. The capsule according to claim 7 and wherein said release mechanism comprises fragile elements breakable under pressure to form multiple apertures in the base of said capsule.

9. The capsule according to claim 8 and wherein said multiple apertures enable flow of said syrup into said bottle.

10. A method for releasing syrup from a capsule into a bottle of carbonated water comprising:
said capsule being placed on a rim of said bottle;
said capsule receiving a downward force; and
said capsule allowing excess gases to vent into the atmosphere via the area between at least one of the outside walls of said capsule and the inner wall of the opening of said bottle.

11. The method according to claim 10 and wherein said capsule comprises a housing to store said syrup and a release mechanism.

12. The method according to claim 11 and wherein said capsule has a membrane between said housing and said release mechanism.

13. The method according to claim 12 and wherein said release mechanism comprises a cutting element to cut said membrane to allow the release of said syrup into said bottle.

14. The method according to claim 12 and wherein said cutting element is an integral part of said release mechanism.

15. The method according to claim 12 and wherein said release mechanism comprises multiple apertures to enable flow of said syrup down the inner sides of said bottle after said cutting to ensure minimal frothing.

16. The method according to claim 12 and wherein said housing and said release mechanism are an integral part of said capsule.

17. The method according to claim 16 and wherein said release mechanism comprises fragile elements breakable under pressure to form multiple apertures in the base of said capsule.

18. The method according to claim 17 and wherein said multiple apertures enable flow of said syrup down the inner sides of said bottle to ensure minimal frothing.

* * * * *

UNITED STATES PATENT AND TRADEMARK OFFICE
CERTIFICATE OF CORRECTION

Page 1 of 1

PATENT NO. : 9,061,825 B2
APPLICATION NO. : 14/322947
DATED : June 23, 2015
INVENTOR(S) : Yaron Kopel et al.

It is certified that error appears in the above-identified patent and that said Letters Patent is hereby corrected as shown below:

Title Page, item (73)

In the Assignee data printed on the patent, the Assignee address "Airport City, IL (US)" should be replaced with -- Airport City (IL) --

Signed and Sealed this
Twenty-seventh Day of October, 2015

Michelle K. Lee
*Director of the United States Patent and Trademark Office*